United States Patent
Scharpenberg et al.

(10) Patent No.: US 11,965,498 B2
(45) Date of Patent: Apr. 23, 2024

(54) METHOD FOR OPERATING A PRESSURE CONTROL SYSTEM HAVING A MULTI-STAGE COMPRESSOR, AND PRESSURE CONTROL SYSTEM

(71) Applicant: WABCO GmbH, Hannover (DE)

(72) Inventors: Joerg Scharpenberg, Burgwedel (DE); Uwe Stabenow, Laatzen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 172 days.

(21) Appl. No.: 16/606,231

(22) PCT Filed: Apr. 11, 2018

(86) PCT No.: PCT/EP2018/059291
§ 371 (c)(1),
(2) Date: Oct. 18, 2019

(87) PCT Pub. No.: WO2018/202393
PCT Pub. Date: Nov. 8, 2018

(65) Prior Publication Data
US 2020/0049137 A1    Feb. 13, 2020

(30) Foreign Application Priority Data
May 5, 2017   (DE) ...................... 10 2017 004 361.2

(51) Int. Cl.
*F04B 25/02*   (2006.01)
*B60G 17/052*   (2006.01)

(52) U.S. Cl.
CPC .......... *F04B 25/02* (2013.01); *B60G 17/0525* (2013.01)

(58) Field of Classification Search
None
See application file for complete search history.

(56) References Cited

U.S. PATENT DOCUMENTS 4,787,211 A    11/1988 Shaw
10,961,999 B2 *   3/2021 Stabenow ............... F04B 41/06
(Continued)

FOREIGN PATENT DOCUMENTS

DE    3716393 A1    11/1987
DE    10321771 A1    12/2004
(Continued)

OTHER PUBLICATIONS

Machine Translation of DE-102008034240 (obtained from https://translationportal.epo.org/) (Year: 2021).*
(Continued)

*Primary Examiner* — Connor J Tremarche
*Assistant Examiner* — Geoffrey S Lee
(74) *Attorney, Agent, or Firm* — LEYDIG, VOIT & MAYER, LTD.

(57) ABSTRACT

A method for operating a pressure control system having a multistage compressor includes outputting, by the multistage compressor in order to fill a pressure medium store or pressure medium chambers of the pressure control system, a pressure medium compressed multiple times. Outputting the pressure medium compressed multiple times includes providing, by a first compression stage, a precompressed pressure medium and further compressing, by a second compression stage, the precompressed pressure medium to form a compressed pressure medium and then outputting the compressed pressure medium. Alternatively, outputting the pressure medium compressed multiple times includes providing a compression pressure medium, which is obtained from additional compression of an already compressed charge pressure medium from the pressure medium reservoir or the pressure medium chambers of the pressure control system, wherein the compression pressure medium is output (Continued)

without additional compression by the second compression stage.

21 Claims, 5 Drawing Sheets

(56) References Cited

U.S. PATENT DOCUMENTS

| | | | | |
|---|---|---|---|---|
| 11,067,075 | B2 * | 7/2021 | Stabenow | B60G 17/056 |
| 11,067,083 | B2 * | 7/2021 | Huang | F04C 23/001 |
| 11,351,828 | B2 * | 6/2022 | Gehrke | B60G 17/0528 |
| 2002/0136645 | A1 * | 9/2002 | Folchert | B60G 17/0523 |
| | | | | 417/302 |
| 2004/0228737 | A1 | 11/2004 | Folchert | |
| 2009/0032158 | A1 * | 2/2009 | Rudolf | B60C 23/00305 |
| | | | | 152/415 |
| 2011/0271699 | A1 * | 11/2011 | Lee | F04C 28/24 |
| | | | | 62/228.4 |
| 2013/0320645 | A1 | 12/2013 | Gall | |
| 2014/0059876 | A1 * | 3/2014 | Folchert | F15B 21/048 |
| | | | | 34/72 |
| 2014/0373718 | A1 | 12/2014 | Bergemann et al. | |
| 2015/0040608 | A1 * | 2/2015 | Nam | F04C 18/356 |
| | | | | 418/63 |
| 2017/0022988 | A1 * | 1/2017 | Huang | F04C 23/001 |

FOREIGN PATENT DOCUMENTS

| | | | | |
|---|---|---|---|---|
| DE | 102008034240 A1 * | 1/2010 | | B60G 17/0523 |
| DE | 102011084666 A1 | 8/2012 | | |
| DE | 102011083614 A1 | 9/2012 | | |
| DE | 102012010390 A1 | 12/2013 | | |
| DE | 102008034240 B4 * | 12/2014 | | B60G 17/0523 |
| DE | 102008034240 B4 | 12/2014 | | |
| EP | 2551526 A2 * | 1/2013 | | F04C 18/3564 |
| EP | 2222488 B1 * | 3/2013 | | B60G 17/0155 |
| WO | WO-2009074367 A1 * | 6/2009 | | B60G 17/0155 |

OTHER PUBLICATIONS

Machine Translation of DE102008034240 (Obtained from USPTO SEARCH, Clarivate Analytics 2022) (Year: 2022).*
Machine Translation of WO2009074367 (Obtained from http://translationportal.epo.org in Jul. 2022) (Year: 2022).*
Machine Translation EP 2551526 (Obtained from USPTO Search) (Year: 2024).*

* cited by examiner

METHOD FOR OPERATING A PRESSURE CONTROL SYSTEM HAVING A MULTI-STAGE COMPRESSOR, AND PRESSURE CONTROL SYSTEM

CROSS REFERENCE TO RELATED APPLICATIONS

This application is a U.S. National Phase Application under 35 U.S.C. § 371 of International Application No. PCT/EP2018/059291, filed on Apr. 11, 2018, and claims benefit to German Patent Application No. DE 10 2017 004 361.2, filed on May 5, 2017. The International Application was published in German on Nov. 8, 2018 as WO 2018/202393 under PCT Article 21(2).

FIELD

The invention concerns a method for operating a pressure control system with a multistage compressor, in particular in a truck, and also concerns a pressure control system with a multistage compressor.

BACKGROUND

Multistage compressors are used to achieve a high compression of a pressure medium, in particular a gas, for example air, in that the pressure medium precompressed in a first compression stage is additionally compressed in a successive second compression stage. Further compression stages may also be provided in a cascade, in which in each case the pressure medium compressed by the preceding compression stage is further compressed.

If consumers, for example a pneumatic suspension system or ride height control system in a vehicle, are to be supplied with pressure medium, such a multistage compressor may be used to provide the pressure medium with a corresponding pressure for supplying compression springs. The multistage compressor here compresses the pressure medium introduced into an intake space from the atmosphere via two or more compression stages, and delivers the pressure medium, compressed in multiple stages, to the compression springs. Alternatively, an already compressed pressure medium from a pressure medium reservoir may be used, which is then compressed a further time by the compressor.

This is described for example in DE 10 2008 034 240 B4, according to which a ride height control system is provided in which a multistage compressor is used to convey the pressure medium from atmosphere or from a pressure medium reservoir, wherein two compression stages are provided. If pressure medium from atmosphere is compressed, the pressure medium is conducted through both compression stages, whereas when conveying pressure medium from the pressure medium reservoir, the pressure medium supplied to the consumer is compressed solely by the second compression stage. In order in this case to reduce or block the compression work of the first compression stage, a shut-off valve is provided which is configured as a 2/2-way directional control valve which, on delivery from the pressure medium reservoir, prevents delivery of compressed pressure medium from the first compression stage to the second compression stage. The shut-off valve is here actuated electrically via a control device.

DE 103 21 771 A1 describes a multistage compressor in which, to disable the first compression stage, a bypass line with a pneumatically controllable shut-off valve is provided, which connects an intake space of the compressor to the first compression space. The pneumatic shut-off valve is here opened depending on the pressure in the intake space, so that a pressure balance between the intake space and the compression space can take place. This serves to disable the first compression stage depending on the pressure of the pressure medium introduced into the intake space. In this way, depending on the introduced pressure medium, in single-stage operation a high compression can be achieved with a low volume flow. In two-stage operation however, a high volume flow is achieved and the pressure medium flows through two compression stages.

According to DE 10 2011 083 614 A1, it is proposed to compress air in two compression stages in an open operating mode and supply the compressed air to a pressure medium reservoir. In a closed operating mode, the already compressed air is transferred from the pressure medium reservoir to an intermediate volume between the first and second compression stages, and compressed again by one of the compression stages in order to then be conveyed to the consumers. Furthermore, a return of air from the consumers to the pressure medium reservoir is provided. Electrically actuated changeover valves are provided for control, which accordingly block and release the flow path for the compressed air or the air to be compressed.

DE 10 2012 010 390 A1 describes a ride height control system in which, in a closed operating mode, air already compressed by a compressor is supplied from the pressure storage container into consumers configured as spring struts. To control the pressure in the ride height control system, a pressure-limiting function is provided either in the form of an outlet valve or in the form of a pre-control valve, each of which release air to the atmosphere when the pressure in the system is too high.

SUMMARY

In an embodiment, the present invention provides a method for operating a pressure control system having a multistage compressor. The method includes outputting, by the multistage compressor in order to fill a pressure medium store or pressure medium chambers of the pressure control system, a pressure medium compressed multiple times. Outputting the pressure medium compressed multiple times includes providing, by a first compression stage, a precompressed pressure medium and further compressing, by a second compression stage, the precompressed pressure medium to form a compressed pressure medium and outputting, by the multi-stage compressor, the compressed pressure medium. Alternatively, outputting the pressure medium compressed multiple times includes providing a compression pressure medium, which is obtained from additional compression of an already compressed charge pressure medium from the pressure medium reservoir or the pressure medium chambers of the pressure control system, wherein the compression pressure medium is output without additional compression by the second compression stage of the multistage compressor in order to adapt the compression power of the second compression stage when at least the first compression stage additionally compresses the charge pressure medium.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The invention provides methods for operating a pressure control system with a multistage compressor which, in a simple and reliable fashion, match a compression power and a compressed volume flow of the multistage compressor to the operating modes of the pressure control system. The invention further provides pressure control systems having a multistage compressor.

According to the invention, a compression power of a second compression stage of a multistage compressor can be reduced to a minimum by a pneumatically or electrically controllable diversion valve, in particular in a closed operating mode of a pressure control system, in particular a pneumatic suspension system in a vehicle. The compression power can be reduced, according to the invention, in that the second compression stage is bypassed, which means that a compression medium compressed in a first compression stage upstream of the second compression stage is diverted around the second compression stage. The second compression stage is thus pneumatically bridged so that a supply of compressed pressure medium to the second compression stage is prevented as soon as the diversion valve is actuated accordingly.

When the compression power of the second compression stage is reduced to a minimum therefore, the volume flow is limited to a through-flow rate of nil from the second compression stage. In other words, the second compression stage is pneumatically completely disabled; the second compression stage thus no longer contributes to the total compression power of the multistage compressor, in particular in closed operating mode, so that the proportion of the second compression stage in the energy consumption of the multistage compressor is reduced purely to friction losses and the compression of the pressure medium remaining in the second compression stage after switching of the diversion valve.

In this way, the advantage can already be achieved that the compression power of the second compression stage can be adapted, simply and reliably in self-regulating or automatic fashion, on changeover to the closed operating mode of the pressure control system which is operated by the multistage compressor.

The first compression stage is not necessarily the compression stage lying at the start in the flow direction in the multistage compressor. Rather, this means that the first compression stage may be any compression stage in the multistage compressor which is followed by at least one further compression stage—the second compression stage—wherein the second compression stage need not necessarily adjoin the first compression stage directly as those terms are used herein. The second compression stage is thus defined in that it lies behind the first compression stage in the flow direction, wherein the second compression stage should not necessarily be regarded as the last compression stage of the multistage compressor.

In an open operating mode of the pressure control system, the multistage compressor provides pressure medium, for example intake air provided via an intake line from the atmosphere, precompressed by the first compression stage for example to an intermediate pressure of 5-6 bar, at a stabilization pressure of the first compression stage of for example 10-15 bar, and introduces this into an intermediate volume. From there, the precompressed air enters the second compression stage in which it is further compressed, for example to a final pressure of 20 bar, and from which it passes via an air dryer into one or more consumers, for example air springs of the pressure control system, and/or into a pressure medium reservoir. Thus the total compression power in open operating mode is determined in this example by the two compression stages.

The closed operating mode is set in particular if the consumers of the pressure control system are to be supplied with highly compressed and/or dried pressure medium. This is the case in particular if rapid pressurization of the consumers is desired, for example if rapid adjustment by the pneumatic suspension control system is necessary by provision of a high final volume flow from the multistage compressor to the consumers, i.e. a high quantity of air per time. Also, the closed operating mode may be set if pressure medium is to be returned from the consumers to the pressure medium reservoir, since renewed compression must then also be guaranteed.

To switch from open operating mode to closed operating mode, for example a changeover valve connecting the pressure medium reservoir or consumers to the charge line is opened by electrical control, so that already compressed pressure medium, referred to below as charge pressure medium, can flow into the charge line. The charge pressure medium may be the pressure medium stored in the pressure medium reservoir, which has already been compressed to a reservoir pressure. If however, in closed operating mode, the already compressed pressure medium from the consumers, referred to below as the chamber pressure medium, is to be returned to the pressure medium reservoir, instead the chamber pressure medium is then the charge pressure medium which is introduced into the charge line. For this, preferably two separate changeover valves are provided for the consumers and the pressure medium reservoir for controlling the respective inflow into the charge line.

The charge pressure medium can reach the first compression stage via the charge line. Here, at the transition from the charge line to the first compression stage, approximately a charge pressure of the charge pressure medium prevails which is slightly reduced in relation to the pressure in the consumers or the pressure medium reservoir, since these pressures diminish on the through-flow through the changeover valve and charge line. Starting from this charge pressure, the already compressed charge pressure medium is additionally compressed in the first compression stage and then reaches the intermediate volume in which the changeover valve is also arranged.

By introduction of the already compressed charge pressure medium into the first compression stage, this can advantageously be additionally compressed in a very efficient fashion, since a large capacity or compression space is available in the first compression stage. In comparison with a conventional design of the multistage compressor, in which the charge pressure medium is introduced into the second compression stage—which, in a two-stage compressor, has a small capacity or compression space in order not to exceed the permitted drive power in open operating mode-, the first compression stage may be designed with a significantly larger capacity and thus produces a larger volume flow, in particular in connection with the disabling of the second compression stage according to the invention.

As soon as the highly compressed charge pressure medium enters the first compression stage, at the same time the intake air, which is to be introduced into the first compression stage from the atmosphere in open operating mode, does not reach the first compression stage since the charge pressure is higher than the ambient pressure. For this, the intake air is preferably introduced into the first compression stage via a check valve. As soon as the charge pressure medium with high charge pressure enters the first compression stage or an intake space of the first compression stage, opening of the check valve and hence the inflow of intake air into the first compression stage is prevented, since now the higher intake pressure of for example 5 bar or more prevails in the first compression stage. As a result, it can be guaranteed that the drying level of the charge pressure medium is retained and the intake air does not deteriorate. In open operating mode, opening of the check valve is not prevented since, during intake, a lower pressure prevails in the intake space and the intake air can flow in unhindered.

The diversion valve arranged in the intermediate volume is configured such that in closed operating mode, it can be switched such that the charge pressure medium additionally compressed in the first compression stage—referred to below as the compression pressure medium—does not pass from the intermediate volume into the second compression stage as in open operating mode, but the second compression stage is bypassed. For this, a pneumatic bypass line may be provided which is arranged at an outlet of the diversion valve which is preferably configured as a 3/2-way directional valve, and returns to the conveying path of the multistage compressor after the second compression stage. For this, the bypass line may for example be coupled to an outlet line leading to the pressure medium reservoir or to the consumers, or to a downstream compression stage of the multistage compressor. The bypass line thus bridges the second compression stage.

The further output of the 3/2-way directional valve (diversion valve) is connected to the second compression stage so that the precompressed pressure medium can be introduced into the second compression stage on corresponding setting of the diversion valve in the open operating mode. The diversion valve thus controls whether or not the first compression stage is connected to the second compression stage via the intermediate volume.

Thus the compression pressure medium provided by the first compression stage in closed operating mode, or the precompressed pressure medium provided by the first compression stage in open operating mode, may be emitted at the corresponding output depending on the switch position of the diversion valve.

According to one embodiment, to switch the diversion valve, it is provided to conduct the charge pressure medium, for example via a pneumatic control line branching off the charge line, also to a pneumatic control input of the diversion valve which is controlled pneumatically in this case. In closed operating mode therefore, a charge pressure prevails in the control line which switches the diversion valve such that the compression pressure medium can flow into the bypass line. In open operating mode however, with the changeover valve closed, no charge pressure medium can enter the control line and the pressure prevailing at the pneumatic control input is low, so this remains in its original position or returns to its original position, for example under the effect of a return spring, in which the precompressed pressure medium is conveyed into the second compression stage.

A switching pressure of the diversion valve is here selected such that switching of the diversion valve occurs at normal charge pressure of for example 4 bar, and the diversion valve is otherwise in or returns to its original position.

According to an alternative embodiment, the diversion valve comprises an electrical control line and an electrical control input, and the pneumatic control line is omitted. Accordingly, on electric switching of the changeover valve or electric switching of the pressure control system into closed operating mode, at the same time a control signal is transmitted to the electrical control input of the diversion valve. In this way, the diversion valve may in this case be switched electrically in order to select whether the compression pressure medium should be conveyed into the bypass line, or whether the precompressed pressure medium should be conveyed into the second compression stage.

Advantageously, by the electric or pneumatic actuation of the diversion valve, in a simple fashion an automatic or self-regulating switching of the diversion valve may take place as soon as closed operating mode is set. Therefore no further electronic circuits, controls or regulating systems are required to achieve this switching. Since the switching is coupled directly to the release of the charge pressure medium from the pressure medium reservoir or the consumers into the charge line or first compression stage, switching takes place without additional complexity or time losses.

Preferably, the bypass line can be coupled after the second compression stage such that the compression pressure medium provided by the first compression stage flows in after an air dryer in the flow direction, wherein the air dryer is arranged in the outlet line after the multistage compressor in the flow direction, so that the pressure medium compressed in the open operating mode can be dried. Since the compression pressure medium compressed in the first compression stage in closed operating mode has approximately the drying level of the charge pressure medium, which has already been dried by the air dryer in open operating mode, further drying is not absolutely necessary and would only lead to unnecessary pressure losses because of the flow through the air dryer. Purely optionally, it may be provided to couple the bypass line to the outlet line before the air dryer in the flow direction, in order to dry the compression pressure medium again if, for example, it is to be assumed that undried intake air from the atmosphere is also entering the first compression stage.

The majority of the total compression power in closed operating mode is thus achieved by compression of the charge pressure medium introduced into the first compression stage from the charge line. Advantageously, the compression power of the second compression stage is automatically reduced to a minimum in closed operating mode, since the second compression stage no longer participates in the compression. The power consumption of the second compression stage may thus be limited, wherein this power consumption is restricted substantially to friction losses and compression of the pressure medium remaining in the second compression stage after closure of the changeover valve.

The drive power of a motor of the compressor is thereby reduced, the energy consumption falls and, in closed operating mode, may be matched primarily to the operation of the first or further compression stages and hence to the final volume flow. Also, a pressure medium which has reached a high drying stage may be supplied to the consumers, since the proportion of undried pressure medium, which is conveyed substantially from the atmosphere, is greatly reduced.

A charge volume flow of the already compressed charge pressure medium introduced into the charge line, i.e. an air quantity per time introduced into the first compression stage, is here in particular dependent on a nominal width of the respective changeover valve and in some cases further upstream valves through which the charge pressure medium flows. The charge volume flow in turn also determines the final volume flow of the pressure medium conveyed towards the consumers or pressure medium reservoir. Both volume flows may be designed higher due to the energy saving according to the invention in the second compression stage, as follows:

Because the compression power and hence also the energy consumption of a motor of the multistage compressor is reduced in the closed operating mode by the omission of the second compression stage, this energy transfer may be used additionally to operate the first compression stage up to an acceptable maximum energy limit, in particular a current limit of for example 35 A. In this way for example, the nominal width of the changeover valve and hence the charge volume flow may be designed higher without exceeding the acceptable maximum energy limit of the multistage compressor. Consequently, an effective power of the pressure control system is increased, since for the same acceptable electrical power, in closed operating mode a significantly higher final volume flow can be guaranteed for the same energy input.

Advantageously, the charge pressure medium from the charge line passes through a further input with check valve into the first compression stage or its intake space, so that an outflow of the charge pressure medium to atmosphere or to any upstream compression stage can be prevented. In this way, a simple design and operation of the pressure control system can be achieved, since the uncompressed pressure medium or intake air in open operating mode, and the charge pressure medium in closed operating mode, are introduced into the multistage compressor at different inputs, and hence no switching of the pressure medium source is required in the first compression stage.

To summarize, with an electrically or pneumatically controlled diversion valve, a simple and economic design of the pressure control system can be achieved with which the efficiency of the compressor can be set optimally, i.e. a high charge volume flow by enlarging the nominal width, in particular of the changeover valve, at a maximal energy consumption which can be set simultaneously, and a dry compression pressure medium. Without this design, the energy in the system would be increased and in addition it would not be possible to maintain the drying level of the system. If only purely closed operation is achieved by completely disabling the second compression stage, a clear physical regulation occurs in relation to the drying level and energy consumption and energy balance of the system.

Optimal operation of the pressure control system is thus achieved for closed operating mode by an optimally designed first compression stage, which is filled by the maximal charge volume flow—defined in particular by the nominal width of the changeover valve—and the maximum charge pressure, and the disabled second compression stage at the power limit of the multistage compressor or upper energy limit. In addition, for safety, an additional pressure relief valve may be provided in the charge line which establishes a maximum charge pressure in the charge line, wherein the maximum charge pressure may be selected depending on the maximum energy limit so that the first compression stage is not operated beyond its performance limit or the power limit of its drive. In addition, the design of the first compression stage of the multistage compressor may be adapted, in that for example a piston ensuring compression in the first compression stage is designed with a larger diameter.

According to the invention, the multistage compressor can be configured as a piston compressor, wherein a first piston forms a first compression stage and a second piston forms the second compression stage; said stages are connected together by the intermediate volume, wherein further compression stages with further pistons may be present. All pistons are moved by a motor via a piston drive in order to successively compress the pressure medium in the corresponding compression space. The compression stages have different compression volumes in order to be able to achieve an efficient precompression by the first compression stage or an efficient additional compression of the charge pressure medium, and an additional compression of the precompressed pressure medium by the second compression stage, and in some cases a further compression by further compression stages. The piston compressor is part of a pressure control system which supplies several springs with compressed air via the compression of air as pressure medium, in order for example to achieve springing or raising and lowering of part of the vehicle, wherein this may take place in a closed or open operating mode.

Advantageously, the diversion valve and the associated transfer lines and the bypass line for self-regulating adjustment of the compressor in closed operating mode may be integrated compactly in a compressor housing, for example a compressor cover. This saves space and weight, and also ensures simple construction with short pneumatic transfer routes and hence low pressure losses. Also advantageously, it is easy to fit the additional pneumatic components into a conventional multistage compressor.

Figure 1A:
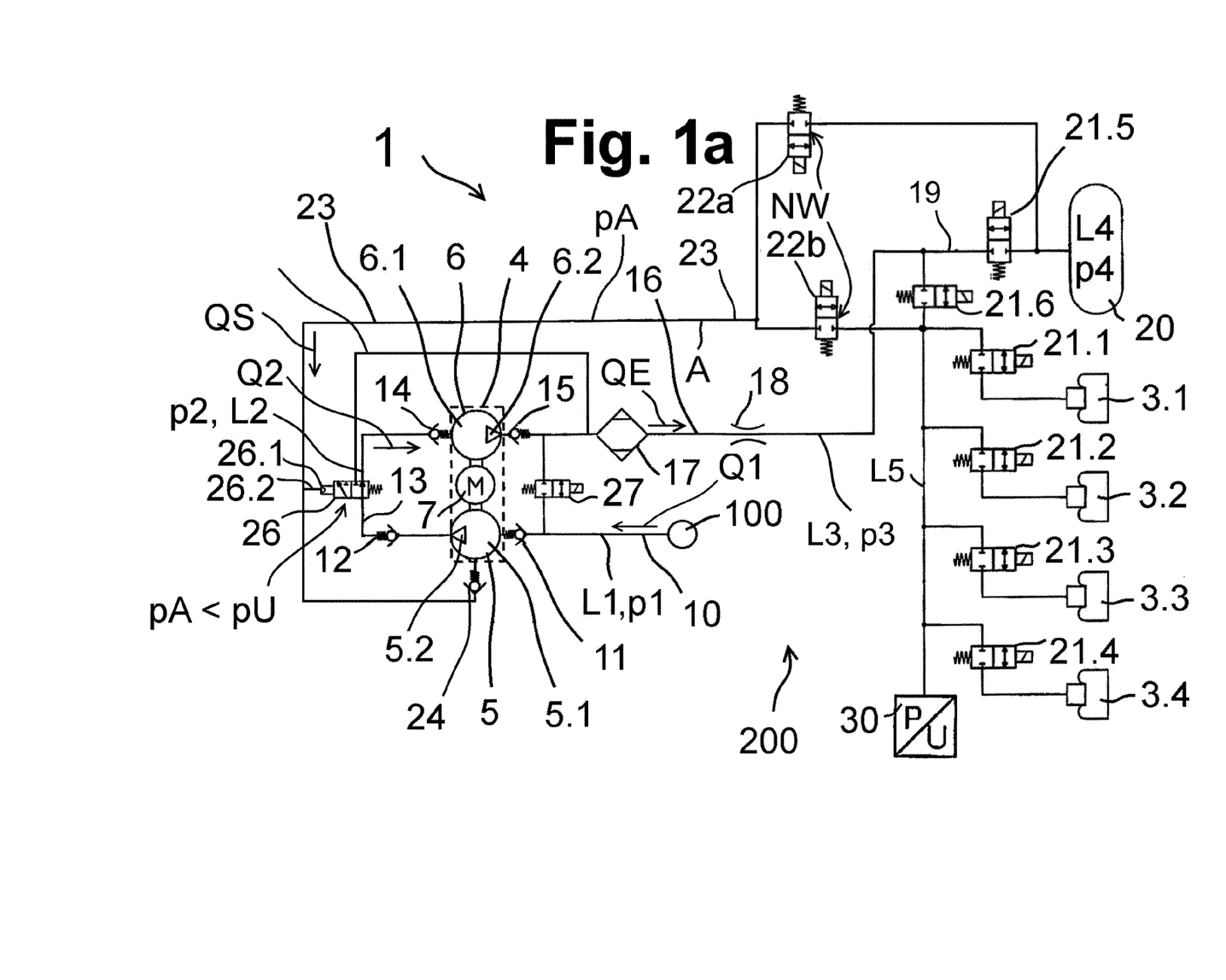
FIGS. 1a, b, and c illustrate embodiments of a pneumatic suspension system with a two-stage compressor.

According to FIG. 1a, b, c, a pressure control system is provided, for example a pneumatic suspension system 1, comprising four pressure medium chambers 3.1, 3.2, 3.3, 3.4 which are each assigned to a consumer, for example air springs of a vehicle 200. The pressure medium chambers 3.i are supplied e.g. with a compressed pressure medium L3, for example air, wherein the compressed pressure medium L3 is compressed in a two-stage compressor 4, for example a piston compressor shown in FIG. 2.

The two-stage compressor 4 has for this a first compression stage 5 and a second compression stage 6, each of which comprise an intake space 5.1, 6.1 and a compression space 5.2, 6.2, wherein pressure medium L1, L2, A flowing into the respective intake space 5.1, 6.1 is compressed in the respective compression space 5.2, 6.2. The compression stages 5, 6 are driven by a motor 7, which causes a piston 8, 9 (see FIG. 2) present in the respective compression stage 5, 6 to move up and down and thereby compress the pressure medium L1, L2, A drawn into the intake chamber 5.1, 6.1 accordingly.

The pressure control system 1 in this embodiment may be operated in two operating modes, an open mode BMo and a closed mode BMc, in each of which air is conveyed and compressed as a pressure medium L1, L2, L3, L4, L5, L6, A. In open mode BMo, intake air L1 is drawn from atmosphere 100, i.e. with an air pressure or intake pressure p1 of around 1 bar and with an intake volume flow Q1, into the first intake space 5.1 of the first compression stage 5 via an intake line 10 and a first inlet valve 11, for example a check valve.

Then the intake air L1 is precompressed initially by the first piston 8 (see FIG. 2) and conducted into the first compression space 5.2. From the first compression space 5.2, the precompressed air L2 with an intermediate pressure p2 and an intermediate volume flow Q2 flows into an intermediate volume 13 via a first outlet valve 12, for example a check valve.

From the intermediate volume 13, the precompressed air L2 in open operating mode BMo passes via a diversion valve 26 and a second inlet valve 14 into the second intake space 6.1 of the second compression stage 6, from which the precompressed air L2 is compressed further via a second piston 9 (see FIG. 2) and introduced into the second compression space 6.2. From the second compression stage 6, the compressed air L3 with a final pressure p3 passes via a second outlet valve 15 into an outlet line 16 leading to an air dryer 17 and a nozzle 18. Then the outlet line 16 conducts the compressed air L3 with a final volume flow QE to the pressure medium chambers 3.1, 3.2, 3.3, 3.4 of the connected consumers, for example the air springs, and via a reservoir line 19 to a pressure medium reservoir 20, in which the compressed air L3 is stored as stored air L4 with a reservoir pressure p4, which is slightly lower than the final pressure p3 because of losses.

The pressure medium reservoir 20 and the pressure medium chambers 3.1, 3.2, 3.3, 3.4 can each be connected to the outlet line 16 or reservoir line 19 by a controllable valve 21.1, 21.2, 21.3, 21.4, 21.5, 21.6, for example a 2/2-way magnetic valve, so that depending on the position of the controllable valves 21.i, the compressed air L3 can flow into the pressure medium chambers 3.1, 3.2, 3.3, 3.4 in order to control the consumers, or into the pressure medium reservoir 20.

Accordingly when the sixth valve 21.6 is open and the first valve 21.1 is open, the compressed air L3 is conducted into the first pressure medium chamber 3.1; with the second valve 21.2 open, into the second pressure medium chamber 3.2; with the third valve 21.3 open, into the third pressure medium chamber 3.3; and with the fourth valve 21.4 open, into the fourth pressure medium chamber 3.4, wherein the fifth valve 21.5 is closed and hence no compressed air L3 can flow into the pressure medium reservoir 20.

If however valves 21.1, 21.2, 21.3, 21.4, 21.6 are in the closed position and the fifth valve 21.5 is open, compressed air L3, which has been dried in the air dryer 17, can be conducted into the pressure medium reservoir 20 where it is stored. Pressure monitoring may take place by a pressure meter 30.

The compressed air L3 may be discharged into the atmosphere 100 via an additional outlet valve 27.

In closed operating mode BMc, the air L4 stored in the pressure medium reservoir 20 may be introduced again into the multistage compressor 4 as charge pressure medium A, so that the already compressed air L4 is compressed a further time.

For this, according to this embodiment, the fifth valve 21.5 remains closed and a first changeover valve 22a, which is arranged in a charge line 23 branching off between the first valve 21.5 and the pressure medium reservoir 20, is opened electrically. The second changeover valve 22b in this case is closed. The charge line 23 is connected to the first compression stage 5 via a third inlet valve 24, for example a check valve, so that in the open position of the first changeover valve 22a, the stored air L4 can flow into the first compression stage 5 and into the first intake space 5.1, in order to be compressed again by the first compression stage 5. The charge pressure medium A thereby further compressed is designated below as the compression pressure medium L6 (FIG. 1b) which is conveyed with a compression pressure p6 and a compression volume flow Q6 from the first compression stage 5 initially into the intermediate volume 13.

The first inlet valve 11 prevents an inflow of stored air L4 into the intake line 10 since it closes in this direction. Also, an inflow of intake air L1 into the first compression stage 5 is prevented since the pressure in the first compression space 5.1 of the first compression stage 5, which corresponds approximately to a charge pressure pA of the charge pressure medium A, or in this case approximately to the reservoir pressure p4, is higher than the intake pressure p1. Thus opening of the first inlet valve 11 and hence the flow of intake air L1 into the first intake space 5.1 is prevented.

If, in closed operating mode BMc, a return of chamber air L5 from the pressure medium chambers 3.i into the pressure medium reservoir 20 is desired, the valve 21.i (with i=1 . . . 4) assigned to the respective pressure medium chamber 3.i, and a second changeover valve 22b, are opened and the sixth valve 21.6 is closed, so that the chamber air L5 is introduced into the charge line 23 as charge pressure medium A, and via this can again flow into the first compression stage 5. The first changeover valve 22a in this case is also closed, and the fifth valve 21.5 opened in order to allow a return to the pressure medium reservoir 20. If only compression of stored air L4 is provided in the pressure control system 1, the path via the second changeover valve 22b may also be omitted.

A nominal width NW of the changeover valves 22a, 22b is here selected for example between 0.5 mm and 4 mm, so that a high charge volume flow QS into the first compression stage 5 may be set.

Since, in closed operating mode BMc, the second compression stage 6 is not necessarily needed for further compression of the charge pressure medium A, since the first compression stage 5 has already achieved adequate compression, the compression power of the second compression stage 6 can be reduced or the second compression stage 6 can be pneumatically fully disabled. This means that in closed operating mode, the second compression stage 6 no longer compresses any pressure medium and thus no air is delivered into the outlet line 16 from the second compression stage 6. In other words, a pressure and/or a volume flow of the pressure medium leaving the second compression stage 6 is limited to almost nil.

To make this possible, the diversion valve 26 is configured as a 3/2-way directional control valve. A bypass line 25 opening into the outlet line 16 is arranged at one of the outputs of the diversion valve 26. Thus the second compression stage 6 can be bridged by the bypass line 25 when the diversion valve 26 is positioned accordingly. The other output of the diversion valve 26 is connected to the second compression stage 6. In this way, depending on the switch position of the diversion valve 26, either the pressure medium L2, which has been precompressed and conveyed by the first compression stage 5 into the intermediate volume 13 in open operating mode BMo, is conducted into the second compression stage 6, or the compression pressure medium L6, which has been conveyed by the first compression stage 5 into the intermediate volume 13 in closed operating mode BMc, is conducted into the bypass line 25.

Figure 1B:
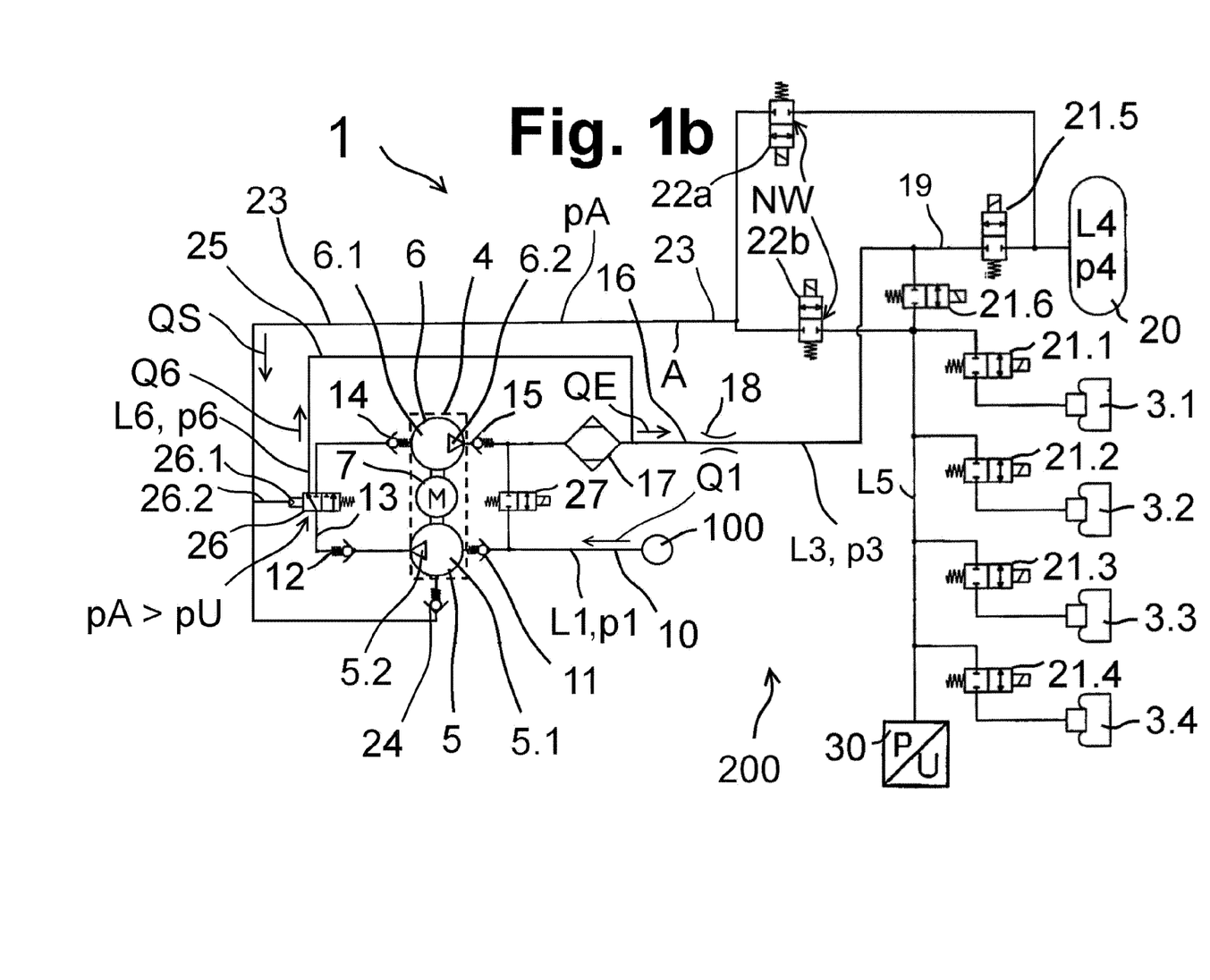

For switching the diversion valve 26, according to the embodiment in FIGS. 1a and 1b, this comprises a pneumatic control input 26.1a which is connected to a pneumatic control line 26.2a, wherein the pneumatic control line 26.2a branches off the charge line 23 according to this embodiment, so that the charge pressure medium A is automatically introduced into the pneumatic control line 26.2a and hence the charge pressure pA of the charge pressure medium A prevails at the control input 26.1a. If the charge pressure pA exceeds a switching pressure pU of for example 4 bar which is normally exceeded by the charge pressure medium A, the diversion valve 26 is switched as shown in FIG. 1b. Since in FIG. 1a, the pressure control system 1 is operated in open mode BMo, the pressure prevailing in the control line 26.2a is smaller than the switching pressure pU, so the changeover valve 26 remains in its original position or falls back to its original position as soon as the system switches from closed operating mode BMc to open operating mode BMo.

As soon as the respective changeover valve 22a, 22b is opened in order to activate the closed operating mode BMc and operate the pneumatic suspension system 1 with the stored air L4 or return the chamber air L5, the compression power of the second compression stage 6 is automatically reduced to zero via the diversion valve 26. For this, the charge pressure pA present at the pneumatic control input 26.1a switches the diversion valve 26 such that the compression pressure medium L6, compressed in the first compression stage 5, is conveyed into the bypass line 25. This position of the diversion valve 26 is shown in FIG. 1b as an example of a closed operating mode BMc, in which the stored air L4 is compressed again since the first changeover valve 22a is open. Compression thus takes place exclusively via the first compression stage 5 in order to supply the pressure medium chambers 3.i with air.

Thus in closed operating mode BMc, a power limitation can be achieved with which the energy consumption of the compressor 4 can be adapted, since no further compression is provided by the second compression stage 6. The required power consumption of the motor 7 of the compressor 4 is thereby limited, since the second piston 9 now has less or no compression work to perform. This may be used to optimize the first compression stage 5 so as to allow optimal setting in particular of a final volume flow QE, an upper energy limit of oE the compressor 4, and a first piston diameter D1 of the first compression stage 6. The first piston diameter D1 is here larger than the second piston diameter D2 of the second compression stage 6.

In the exemplary embodiment shown in FIG. 1a, the bypass line 25 leads into the outlet line 16 upstream of the air dryer 17, and in the exemplary embodiment shown in FIG. 1b, the bypass line 25 opens into the outlet line 10 downstream of the air dryer 17. Thus depending on requirement, the compression pressure medium L6 may be dried a further time in closed operating mode BMc. This may be necessary for example if it cannot be excluded that e.g. a small proportion of intake air L1 still reaches the first compression stage in closed operating mode BMc, and hence the drying level of the charge pressure medium A is reduced.

Figure 1C:
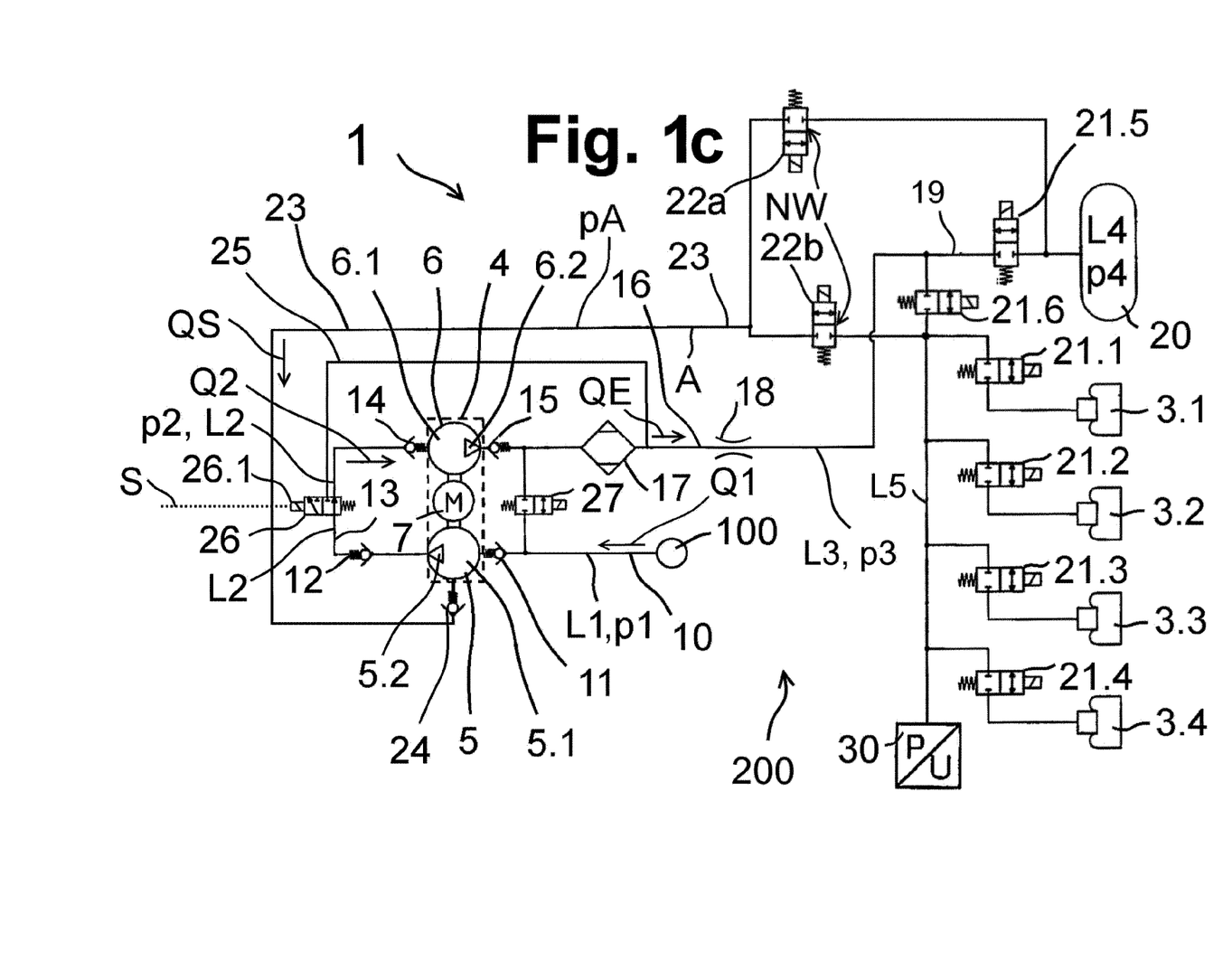

According to FIG. 1c, in contrast to FIGS. 1a and 1b, an electrical actuation of the diversion valve 26 is provided. For this, the control input 26.1b is designed as an electrical input and the control line 26.2b is also an electrical line via which a control signal S is transmitted. The control signal S may here be the same signal which is output to the changeover valve 22a, 22b, in order to open these under electric control when switching to closed operating mode BMc. Thus the charge pressure medium A may be released without time losses and at the same time the second compression stage 6 disabled.

Figure 2:
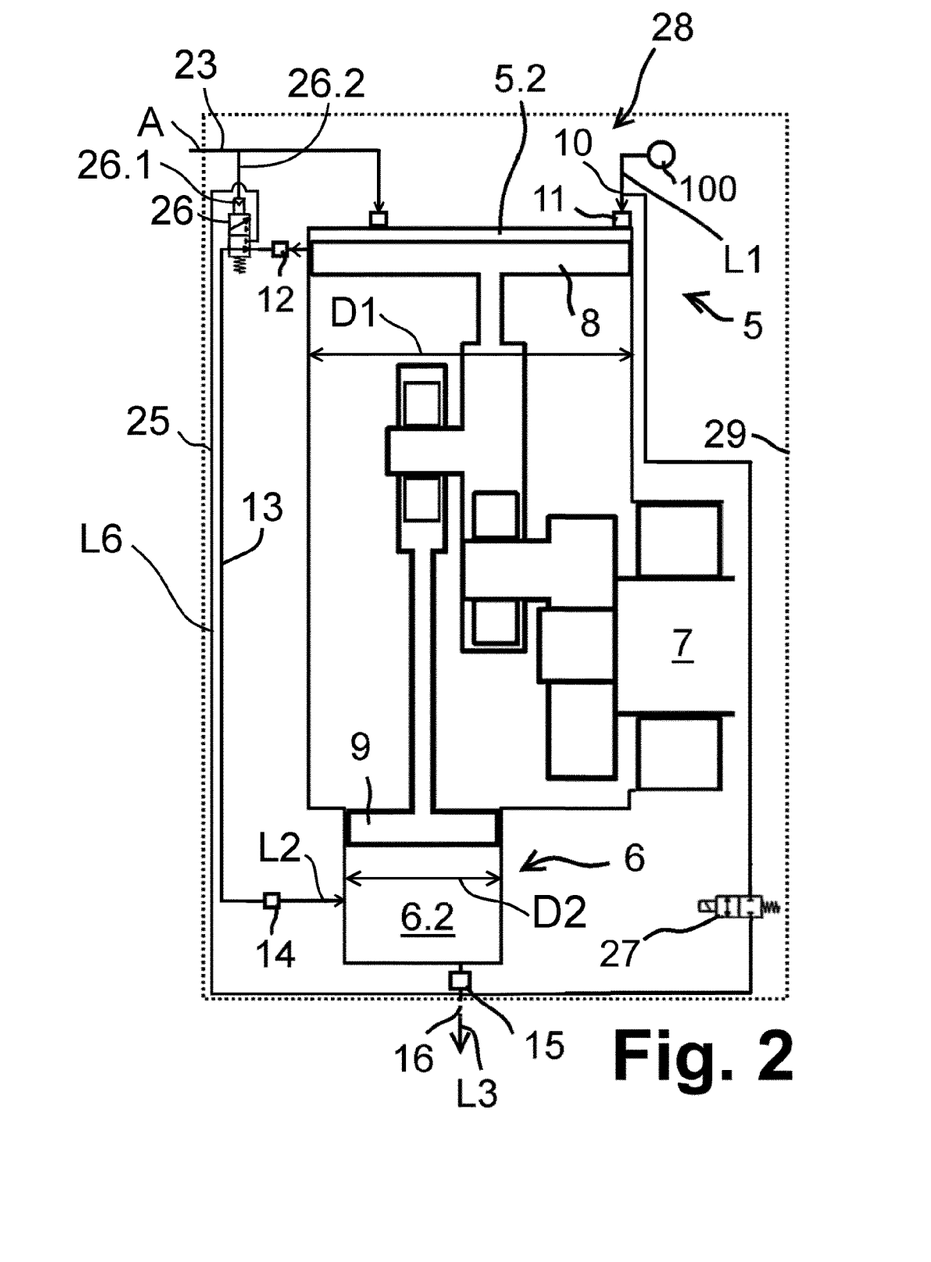
FIG. 2 illustrates a two-stage compressor with an integrated pressure-controlled diversion valve.

In FIG. 2, the multistage piston compressor 4 is shown diagrammatically with the first and second compression stages 5, 6, in a view corresponding to the embodiment shown in FIG. 1a. The two compression stages 5, 6 are connected together via the intermediate volume 13 so that, in open operating mode BMo, the air L2, which has been precompressed in the first compression stage 5 by the first piston 8, can be conveyed into the second compression stage 6 in order to be compressed further there by the second piston 9.

In closed operating mode BMc, via the charge line 23, the charge pressure medium A is conducted into the first compression stage 5 and via the pneumatic control line 26.2a to the pneumatic control input 26.1a of the diversion valve 26. In a corresponding switch position of the changeover valve 26, the compression pressure medium L6 conveyed from the first compression stage 5 is conveyed into the outlet line 13 via the bypass line 25. The pneumatic diversion valve 26, the associated transfer lines 23, 26.2a and the bypass line 25 may be arranged compactly for example in the compressor cover 28 of the compressor housing 29. The inlet valves 10, 12, 14, 15, which are each configured as check valves, prevent the respective compressed pressure medium L2, L6 from being returned.

Figure 3:
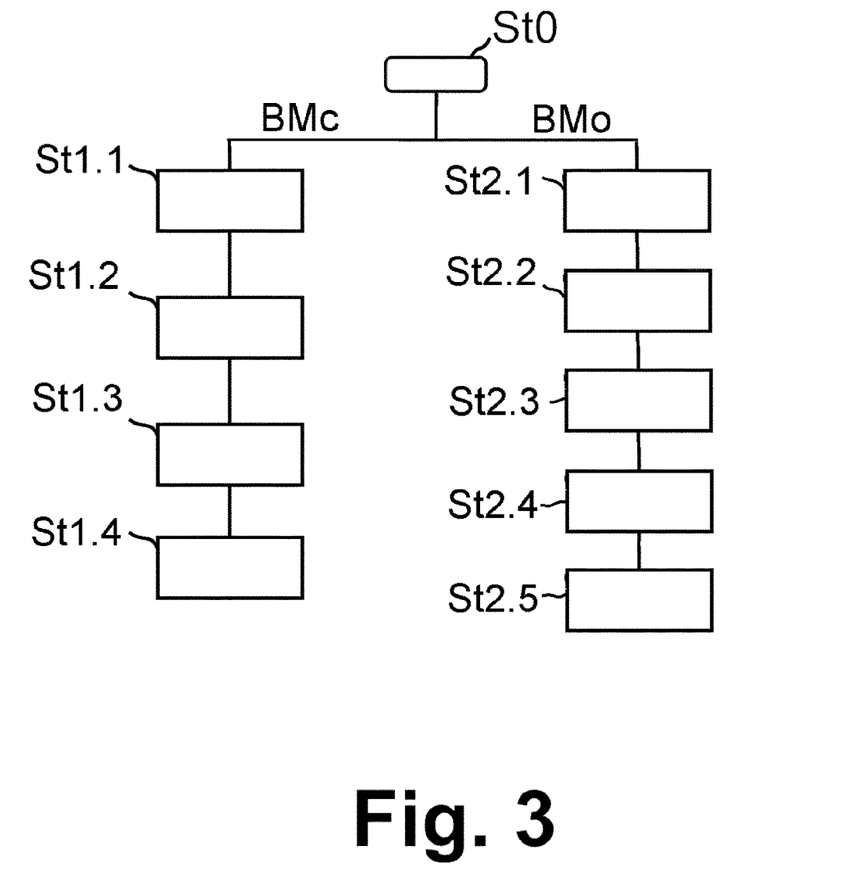
FIG. 3 is a flow diagram illustrating the performance of a method according to an embodiment of the invention.

According to FIG. 3, a method according to an embodiment of the invention for operating the pneumatic suspension system 1 may be carried out as follows:

In an initial step St0, it is checked which operating mode BMo, BMc of the pressure control system is set.

If the closed operating mode BMc of the pressure control system 1 is set, in a first step St1.1, the charge pressure medium A is released via the respective changeover valve 22a, 22b and introduced via the charge line 23 into the first compression stage 5, compressed again and conveyed into the intermediate volume 13 is a compression pressure medium L6.

At the same time, in a second step St1.2, the charge pressure medium A passes via the pneumatic control line 26.2a to the pneumatic control input 26.1a of the diversion valve 26 configured as a 3/2-way directional valve, or an electrical control signal S is output to the electrical control input 26.1b (present in this case) of the diversion valve 26 configured as a 3/2-way directional valve. Then in a third step St1.3, the diversion valve 26 is switched by the charge pressure pA applied or by the control signal S, wherein in both cases this takes place only when the pressure control system 1 is in the closed operating mode BMc.

In this switch position of the diversion valve 26, in a fourth step St1.4, the compression pressure medium L6, which has been compressed by the first compression stage 5, is conveyed into the outlet line 16 via the bypass line 25, so that the second compression stage 6 is bypassed or bridged; the first compression stage 5 is thus no longer connected to the second compression stage 6 via the intermediate volume 13. Thus the compression power of the second compression stage 6 is reduced to a minimum, since the power consumption of the second compression stage 6 is limited to friction losses. This energy gain may be used for optimal setting of the first compression stage 5, so as to allow optimal setting in particular of the final volume flow QE, the upper energy limit of oE the compressor 4, and the first piston diameter D1 of the first compression stage 6. The compression pressure medium L6 is then made available to the consumers 3.i or the pressure medium reservoir 20.

In open operating mode BMo, the intake air L1 from the atmosphere 100 reaches the first compression stage 5 in a step St2.1. In the first compression stage 5, the intake air L1 is precompressed to the intermediate pressure p2 in a second step St2.2, and introduced into the intermediate volume 13 in a third step St2.3. Since, because of the closed changeover valves 22a, 22b, no charge pressure medium A is present at the diversion valve 26 or no corresponding control signal S for switching is given, the diversion valve 26 remains in its original position in which the first compression stage 5 is connected to the second compression stage 6 via the intermediate volume 13, so that the precompressed pressure medium L2 can flow out of the intermediate volume 13 into the second compression stage 6. Here, in a fourth step St2.4, a further compression of the pre-compressed pressure medium L2 takes place to the final pressure p3. In a final step St2.5, the compressed pressure medium L3 reaches the pressure medium chambers 3.*i* or the pressure medium reservoir 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Pneumatic suspension system
3.*i* Pressure medium chambers
4 Two-stage compressor
5 First compression stage
5.1 First intake space
5.2 First compression space
6 Second compression stage
6.1 Second intake space
6.2 Second compression space
7 Motor
8 First piston of first compression stage
9 Second piston of second compression stage
10 Intake line
11 First inlet valve
12 First outlet valve
13 Intermediate volume
14 Second inlet valve
15 Second outlet valve
16 Outlet line
17 Air dryer
18 Nozzle
19 Reservoir line
20 Pressure medium reservoir
21.*i* Controllable valves
22*a* First changeover valve
22*b* Second changeover valve
23 Charge line
24 Third inlet valve
25 Bypass line
26 Diversion valve (3/2-way valve)
26.1*a, b* Control input (pneumatic, electric)
26.2*a, b* Control line (pneumatic, electric)
27 Outlet valve
28 Compressor cover
29 Compressor housing
30 Pressure meter
100 Atmosphere
200 Vehicle
A Charge pressure medium
BMo Open operating mode
BMc Closed operating mode
D1 First piston diameter
D2 Second piston diameter
L1 Intake air
L2 Precompressed air
L3 Compressed air
L4 Stored air
L5 Chamber air
L6 Compression pressure medium
oE Upper energy limit
NW Nominal width
pA Charge pressure
p1 Air pressure/intake pressure
p2 Intermediate pressure
p3 Final pressure
p4 Reservoir pressure
p6 Compression pressure
pU Switching pressure
Q1 Intake volume flow
Q2 Intermediate volume flow
Q6 Compression volume flow
QE Final volume flow
QA Charging volume flow
S Control signal
St1.1, St1.2, St1.3, St1.4 Steps of method in BMc
St2.1, St2.2, St2.3, St2.4, St2.5 Steps of method in BMo

The invention claimed is:

1. A method for operating a pressure control system having a multistage compressor, the method comprising:
outputting, by the multistage compressor in order to fill at least one of a pressure medium reservoir or pressure medium chambers of the pressure control system, a pressure medium compressed multiple times, wherein outputting the pressure medium compressed multiple times includes:
operating the pressure control system in an open mode, which includes:
providing, by a first compression stage of the multistage compressor, a pre-compressed pressure medium by compressing the pressure medium drawn from an ambient environment, and further compressing, by a second compression stage of the multi-stage compressor, the pre-compressed pressure medium to output a compressed pressure medium; and
operating the pressure control system in a closed mode, which includes:
providing a further compressed pressure medium, which is obtained from additional compression, by the first compression stage, of the compressed pressure medium from at least one of the pressure medium reservoir or the pressure medium chambers of the pressure control system, wherein the further compressed pressure medium is output without additional compression by the second compression stage of the multistage compressor by diverting the further compressed pressure medium around the second compression stage,
wherein the first compression stage and the second compression stage of the multistage compressor are driven by a single motor.

2. The method of claim 1, wherein the further compressed pressure medium is diverted around the second compression stage in a bypass line bridging the second compression stage in order to prevent further compression of the-further compressed pressure medium by the second compression stage.

3. The method of claim 2, wherein the bypass line opens into an outlet line upstream or downstream of an air dryer, and wherein the further compressed pressure medium is output, via the outlet line with or without further drying in the air dryer, to the pressure medium reservoir or the pressure medium chambers of the pressure control system.

4. A system configured to operate the pressure control system by performing the method of claim 3.

5. A system configured to operate the pressure control system by performing the method of claim 1.

6. A method for operating a pressure control system having a multi-stage compressor, the method comprising:
operating in an open mode in which a pressure medium for the multi-stage compressor is drawn from an ambient environment by: flowing the pressure medium into the multi-stage compressor from the ambient environment; compressing the pressure medium with a first stage of the multi-stage compressor and a second stage of the multi-stage compressor that compresses an output of the first stage of the multi-stage compressor; and outputting the compressed pressure medium from the multi-stage compressor; and
operating in a closed mode in which the pressure medium for the multi-stage compressor is drawn from the pressure control system by: flowing the compressed pressure medium into the first stage of the multi-stage compressor from at least one of a pressure medium reservoir or a pressure medium chamber of the pressure control system; compressing the compressed pressure medium with the first stage of the multi-stage compressor to generate a further compressed pressure medium; and outputting the further compressed pressure medium from the multi-stage compressor without compressing the further compressed pressure medium with the second stage of the multi-stage compressor,
wherein the first compression stage and the second compression stage of the multistage compressor are driven by a single motor.

7. The method of claim 6, comprising operating the pressure control system in the open mode, then later operating the pressure control system in the closed mode; wherein in the open mode, the first stage and the second stage of the multi-stage compressor are downstream of, and in fluid communication with, the ambient environment; and wherein in the open mode, the pressure medium flows into the multi-stage compressor from the ambient environment.

8. The method of claim 6, comprising:
operating the pressure control system in the open mode, wherein operating in the open mode comprises flowing the compressed pressure medium output from the multi-stage compressor into the pressure medium reservoir or the pressure medium chamber; and subsequently operating in the closed mode, wherein operating in the closed mode comprises flowing the compressed pressure medium from the pressure medium reservoir or the pressure medium chamber to the multi-stage compressor.

9. The method of claim 8, comprising initiating operation of the closed mode based on a measured pressure of the compressed pressure medium in at least one of the pressure medium reservoir or the pressure medium chamber.

10. The method of claim 6, wherein the pressure control system comprises an inlet for flowing pressure medium into the pressure control system from the ambient environment and an inlet valve; wherein responsive to the pressure control system operating in the open mode, the inlet valve is open such that the ambient environment is in fluid communication with the first stage of the multi-stage compressor; and wherein responsive to the pressure control system operating in the closed mode, the inlet valve is closed such that the ambient environment is not in fluid communication with the first stage of the multi-stage compressor.

11. The method of claim 6, wherein the pressure control system comprises a diversion valve configured to bypass fluid around the second stage of the multi-stage compressor responsive to the pressure control system operating in the closed mode.

12. The method of claim 11, wherein the pressure control system is configured to automatically switch between the open mode and the closed mode by electrically or pneumatically adjusting one or more valves.

13. A pressure control system configured to perform the method of claim 6, the pressure control system comprising:
the multi-stage compressor;
the pressure medium chamber;
the pressure medium reservoir;
a diversion valve configured to:
in a first mode, direct pressure medium exiting the first stage of the multi-stage compressor into the second stage of the multi-stage compressor to generate the compressed pressure medium; and
in a second mode, bypass the further compressed pressure medium exiting the first stage of the multi-stage compressor around the second stage of the multi-stage compressor.

14. The pressure control system of claim 13, wherein the diversion valve is a 3/2-way directional control check valve.

15. The pressure control system of claim 13, comprising a first inlet valve disposed upstream of the first stage of the multi-stage compressor and configured to introduce the pressure medium from the ambient environment into the first stage, wherein the first inlet valve is configured to automatically close responsive to the pressure control system operating in the closed mode.

16. The pressure control system of claim 13, wherein the pressure control system comprises an air dryer arranged downstream of the multistage compressor for drying the pressure medium, and
wherein a line for bypassing the second stage of the multi-stage compressor is connected upstream or downstream of the air dryer.

17. The pressure control system of claim 13, wherein a diameter of a piston of the first stage is larger than a diameter of a piston of the second stage.

18. The pressure control system of claim 13, wherein the diversion valve and a line for bypassing the second stage of the multi-stage compressor are integrated in a common housing of the multistage compressor.

19. A pneumatic suspension system of a vehicle comprising the pressure control system of claim 13.

20. A vehicle comprising the pressure control system of claim 13.

21. A method for operating a pressure control system having a multistage compressor, the method comprising:
- drawing in a pressure medium from an ambient environment;
- driving a motor to compress the pressure medium from the ambient environment with a first compression stage;
- driving the motor to further compress the pressure medium compressed by the first compression stage with a second compression stage;
- driving the motor to further compress the pressure medium compressed by the second compression stage with the first compression stage;
- diverting the pressure medium further compressed by the first compression stage around the second compression stage such that the pressure medium further compressed by the first compression stage is not compressed again by the second compression stage; and
- outputting the pressure medium further compressed by the first compression stage to fill a pressure reservoir or a plurality of pressure medium chambers.

* * * * *